United States Patent [19]

Kobayashi et al.

[11] Patent Number: 4,639,712

[45] Date of Patent: Jan. 27, 1987

[54] SHEATHED HEATER

[75] Inventors: Akihiro Kobayashi, Hazu; Shunzo Yamaguchi, Okazaki; Kiyomi Kobayashi, Kariya; Hiroaki Takaba, Ohbu, all of Japan

[73] Assignee: Nippondenso Co., Ltd., Kariya, Japan

[21] Appl. No.: 789,768

[22] Filed: Oct. 21, 1985

[30] Foreign Application Priority Data

Oct. 25, 1984 [JP] Japan ................................ 59-224381

[51] Int. Cl.$^4$ ........................ H01C 1/03; H01C 1/028; H01M 6/36; H01M 2/18

[52] U.S. Cl. .................................... 338/238; 338/243; 338/251; 429/133; 429/112

[58] Field of Search ........................ 338/238, 243, 251; 423/409; 429/133, 112

[56] References Cited

U.S. PATENT DOCUMENTS 4,034,330 7/1977 Goto .................................. 338/238

FOREIGN PATENT DOCUMENTS 51-11319 4/1976 Japan .................................. 429/133
57-52871 11/1982 Japan .

*Primary Examiner*—E. A. Goldberg
*Assistant Examiner*—Linda M. Peco
*Attorney, Agent, or Firm*—Cushman, Darby & Cushman

[57] ABSTRACT

A sheathed heater comprising a metallic sheath, such as a stainless steel sheath, an electric heating element disposed within the sheath so that an electric current can be supplied thereto, and a filling material filled in the sheath for insulating the heating element from the sheath and the coils of the heating element from each other. Aluminum nitride powder is used as the filling material to prevent oxidation of the heating element by the oxygen discharged from the filling material.

3 Claims, 2 Drawing Figures

SHEATHED HEATER

BACKGROUND OF THE INVENTION

1. Field of the Invention

The present invention relates to a sheathed heater and, more specially, to a sheathed heater having improved durability.

2. Prior Art

A conventional sheathed heater comprises a metallic sheath, a coiled metallic heating element sheathed in the metallic sheath and an insulating material, such as magnesia powder (MgO powder) filled in the sheath to insulate the metallic heating element from the metallic sheath and to insulate the coils of the metallic heating element from each other. A sheathed heater employing boron nitride and magnesia as insulating materials (filling material) is disclosed in Japanese Utility Model Application No. 57-52871.

In such a conventional sheathed heater, the oxygen component of the filled magnesia is liable to dissociate and to oxidize the metallic heating element gradually until the heating element is broken, particularly in the course of a long period of use.

SUMMARY OF THE INVENTION

The present invention has been made to eliminate the disadvantages of the conventional sheathed heater. Accordingly, it is an object of the present invention to provide a sheathed heater having improved durability and employing an insulating material which will not produce enough oxygen which oxidizes the heating element of the sheathed heater.

A sheathed heater according to the present invention comprises a sheath, an electric heating element sheathed in the sheath and a filling material filled in the sheath, in which the principal component of the filling material is aluminum nitride powder.

The sheath is a protective member to protect the electric heating element and the filling material packed therein and is preferably made of a metal such as a stainless steel. The electric heating element is made of a conductive material such as nickel, however, the electric heating element may be made of any other heat-resistant metal.

The above and other objects, features and advantages of the present invention will become more apparent from the following description of the preferred embodiment thereof taken in conjunction with the accompanying drawings.

DESCRIPTION OF THE PREFERRED EMBODIMENTS

Figure 1:
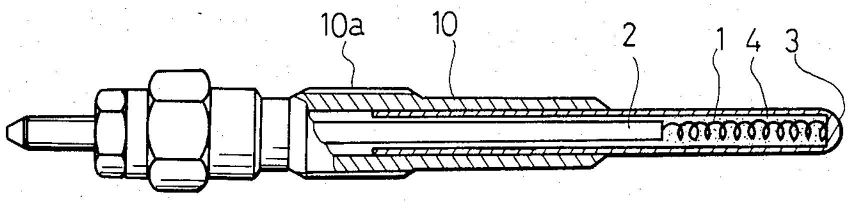
FIG. 1 is a partially sectional front elevation of a sheathed heater according to the present invention as applied to a glow plug.

Prior to the description of the preferred embodiments of the present invention, the results of experiments carried out to examine the performance of possible filling materials will be described.

The present invention employs aluminum nitride as a filling material, however, silicon nitride and silicon carbide also are possible filling materials. The performance of aluminum nitride (AlN), boron nitride (BN), silicon nitride ($Si_3N_4$), silicon carbide (SiC) and a mixture of titanium nitride (TiN) and titanium carbide (TiC) was evaluated through experiments in respect of insulation resistance, heat conductivity and filling performance. The results of the experiments in respect of insulation resistance, heat conductivity and filling performance are shown in Table 1.

TABLE 1

| | INSULATOR RESISTANCE (Ω · cm) | HEAT CONDUCTIVITY (cal/sec · cm · °C.) | FILLING PROPERTY | GENERAL PERFORMANCE |
|---|---|---|---|---|
| AlN | $>10^{14}$ | 0.07 | GOOD | GOOD |
| BN | $>10^{14}$ | 0.04 | INFERIOR | BAD |
| $Si_3N_4$ | $>10^{14}$ | 0.05 | INFERIOR | BAD |
| SiC | $10^2$ | 0.2 | | BAD |
| TiN/TiC | $10^{-4}$ | 0.04 | | BAD |

Since the present invention employs a filling material for insulating the heating element from the sheath and for insulating the coils of the heating element from each other, the filling material must be an insulating powder preferably having an insulating resistance of 10 Ω·cm or above. Accordingly, as apparent from Table 1, aluminum nitride (AlN), boron nitride (BN) and silicon nitride ($Si_3N_4$) are possible filling materials in respect of insulating resistance.

In view of the heating performance of a sheathed heater, a filling material having a high heat conductivity is desirable. All those materials subjected to the experiments have a heat conductivity the same as or higher than that of magnesia (MgO) (0.05 cal/sec·cm·°C.) which has been conventionally used as the filling material for a sheathed heater. Aluminum nitride and silicon carbide, in particular, are superior to magnesia in heat conductivity.

Sheathed heaters filled with aluminum nitride, silicon nitride and boron nitride, respectively, were subjected to heating experiments. The heating performance of the sheathed heater filled with aluminum nitride powder was satisfactory, whereas some sheathed heaters filled with silicon nitride powder and boron nitride powder, respectively, were unsatisfactory in heating performance. Such unsatisfactory heating performance is deemed to be due to short circuits between the coils of the heating element resulting from insufficient insulation between the coils attributable to the interior filling performance of the filling material.

Accordingly, aluminum nitride is the most suitable filling material.

It is a general knowledge that the filling density of a ceramic powder is dependent on the fluidity, adhesion and particle size of the powder. However, it is difficult to estimate the filling performance of a ceramic powder theoretically. Magnesia (MgO) powder, aluminum nitride (AlN) powder, silicon nitride ($Si_3N_4$) powder and boron nitride (BN) powder were subjected to filling tests.

The filling performances of those powders were evaluated through a comparison of measured results. The filling performance was determined by the following procedures:

(1) Weighing a glass measuring cylinder containing 40 cc of a ceramic powder.

(2) Vibrating the glass measuring cylinder for 10 minutes.

(3) Measuring the volume of the powder to determine the density.

Every tested ceramic powder had a medium particle size of 40 μm and a maximum particle size of approximatelty 75 μm.

The vibrator employed in the experiments was the vibrator type VP(SHINKO ELECTRIC CO., LTD.) and the vibrating conditions were 10G, 60 Hz and sinusoidal vibration. The results of the experiments in respect of Density and Filling ratio for possible filling materials are shown in Table 2 as below.

TABLE 2

| | DENSITY | FILLING RATIO | COMPERISON WITH MgO |
|---|---|---|---|
| MgO | 2.00 | 54.8 | STANDARD |
| AlN | 1.80 | 59.1 | GOOD |
| $Si_3N_4$ | 1.31 | 41.0 | INFERIOR |
| BN | 0.95 | 42.1 | INFERIOR |

As apparent from Table 2, the filling ratio 59.1% of aluminum nitride powder is higher than the filling ratio 54.8% of magnesia powder. A higher filling ratio ensures the insulation of the heating element from the sheath and improves the thermal conductivity, and hence prevents short circuits between the coils of the heating element and improves the temperature-rising performance of the sheathed heater.

An aluminum nitride powder having an average particle size in the range of 20 to 70 μm is desirable. When the average particle size is less than 20 μm, the filling performance is deteriorated due to the reduction of fluidity. When the average particle size is greater than 70 μm, the filling performance is deteriorated due to increase in voids.

Desirably, the impurity content of the aluminum nitride powder is 1% or below, however, as apparent from the test results shown in Table 3, an aluminum nitride powder containing 20 mol% or less oxygen-equivalent impurities, such as magnesia, is satisfactorily applicable.

TABLE 3

| EXP. NO. | MATERIAL | IMPURITY CONTENT OXYGEN EQUV'T (mol %) | PERFORMANCE |
|---|---|---|---|
| 1 | AlN | 1 | GOOD |
| 2 | AlN | 10 | GOOD |
| 3 | AlN | 20 | GOOD |
| 4 | AlN | 30 | ORDINARY |
| 5 | AlN | 50 | ORDINARY |

Table 3 shows the results of the durability tests of sheathed heaters filled with aluminum nitride having different impurity contents. Nickel wires were used as coiled metallic heating elements for the tests and the diameter of nickel wires was 0.23 mm and the electric current was regulated so that the surfaces of the nickel wires were stabilized at the temperature of 1,050° C. in the air. The sheathed heaters were placed in an oven heated approximately at 900° C. The electric current was supplied to the nickel wires for 1 minute and not supplied for 4 minutes alternately at 5-minute cycle for four weeks to test if the heating elements break. In TABLE 3, GOOD indicates nickel wire did not break within four weeks and ORDINARY indicates the nickel wire did not break within three weeks.

EMBODIMENT 1

FIG. 1 is a partially sectional front elevation of a sheathed heater, in a first embodiment, according to the present invention as applied to a glow plug of an diesel engine.

Referring to FIG. 1, an electric heating element 1 is formed by coiling a metallic wire, such as a nickel wire, a nickel-chromium alloy wire or a tungsten wire. One end of the electric heating element is welded to an electrode pin 2 and the other end of the same is welded to the inner surface of one end of a stainless steel sheath 3, i.e., a protective pipe. The sheath 3 has the form of a pipe with one end open and the other end closed. The open end of the sheath 3 is fixedly fitted in a plug body 10.

The sheath 3 is filled as compactly as possible with a filling material 4, to give a particular example, aluminum nitride powder. In filling the filling material 4 in the sheath 3, the sheath is vibrated so that the sheath 3 is filled compactly with the filling material 4. Thus the filling material 4 surely insulates the heating element 1 from the sheath 3 and the coils of the heating element 1 from each other and the heat generated by the heating element 1 is transmitted rapidly to the sheath 3. In FIG. 1, indicated at 10*a* is an external thread formed in the plug body 10 for screwing the glow plug on the engine.

EMBODIMENT 2

Figure 2:
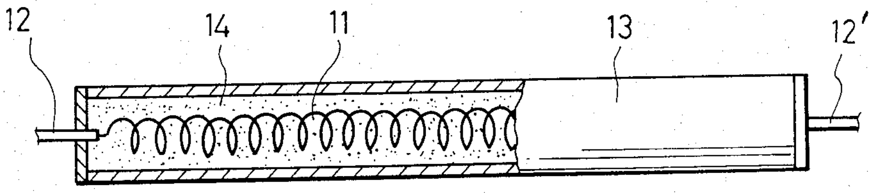
FIG. 2 is partially sectional front elevation of a sheathed heater according to the present invention as applied to a heater for space heating.

FIG. 2 is a partially sectional front elevation of a sheathed heater, in a second embodiment, according to the present invention as applied to a heating pipe for space heating. The opposite ends of a coiled heating element 11 are connected to electrodes 12 and 12', respectively. A sheath 13 containing the heating element 11 and a filling material 14 serve merely as a protective cover.

Although both the embodiments shown in FIGS. 1 and 2 employ coiled heating elements 1 and 11, respectively, the heating element need not necessarily be a coiled heating element, and a linear heating element may be employed. However, in view of providing a heating element having a desired resistance in a limited space, a coiled heating element is preferable.

According to the present invention, aluminum nitride powder is employed as a filling material, and hence the filling material will not be decomposed to discharge oxygen even if the filling material is heated for a long time. Accordingly, the heating element will not be oxidized and the life thereof is extended, and hence the life of the sheathed heater is extended.

What is claimed is:

1. A sheathed heater, comprising:

a sheath;

an electric heating element disposed within said sheath; and an electrically insulating filling material packed into said sheath for electrically insulating said electric heating element from said sheath, and for preventing electrical short-circuiting between spacedly-adjacent portions of said electric heating element within said sheath;

said filling material being constituted by 80 mol percent or more of aluminum nitride powder, and 20 mol percent or less of a metallic oxide powder.

2. A sheathed heater according to claim 1, wherein the average particle size of said aluminum nitride powder is in the range of 20 to 70 μm.

3. A sheathed heater according to claim 1, wherein said metallic oxide powder is magnesia powder.

* * * * *